March 4, 1930.  F. H. ROYCE  1,749,609
SHOCK ABSORBER
Filed Dec. 24, 1926  2 Sheets-Sheet 1
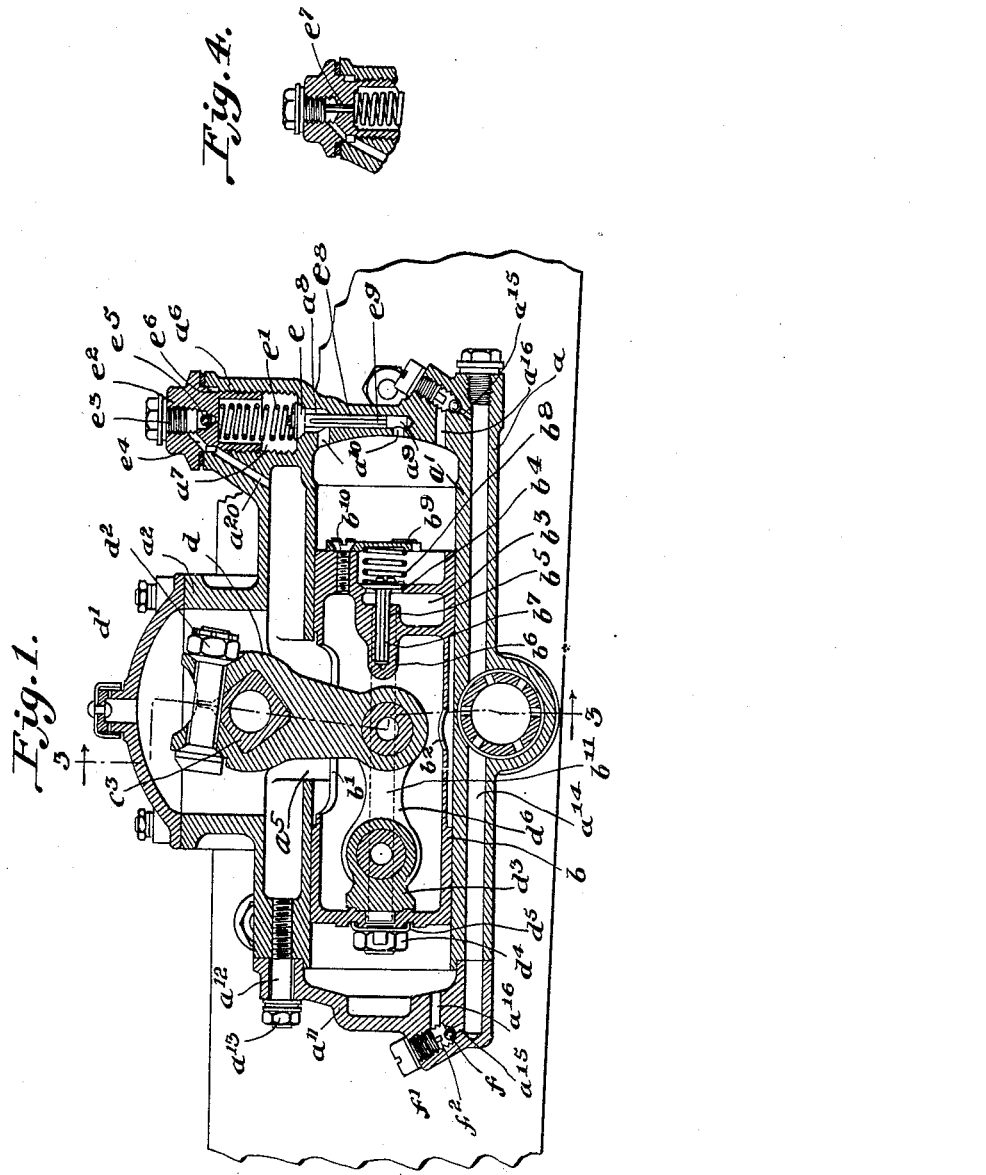

March 4, 1930.  F. H. ROYCE  1,749,609
SHOCK ABSORBER
Filed Dec. 24, 1926   2 Sheets-Sheet 2
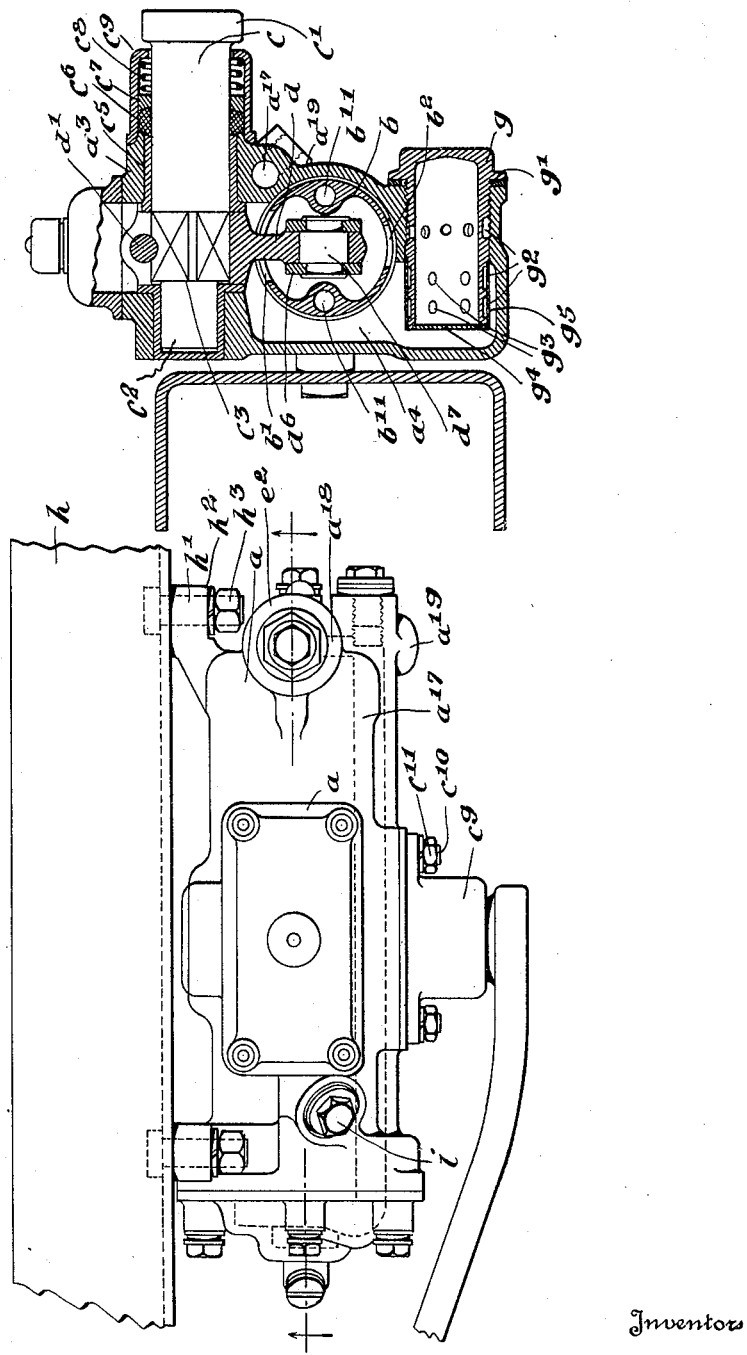
Inventor
F. H. Royce
By Mason Fenwick & Lawrence
Attorneys Patented Mar. 4, 1930

1,749,609

UNITED STATES PATENT OFFICE

FREDERICK HENRY ROYCE, OF WEST WITTERING, NEAR CHICHESTER, ENGLAND, ASSIGNOR TO ROLLS-ROYCE LIMITED, OF DERBY, ENGLAND

SHOCK ABSORBER

Application filed December 24, 1926, Serial No. 156,966, and in Great Britain December 31, 1925.

The invention is a new and improved shock absorber, mainly useful in motor vehicles to mitigate the effect of road inequalities, of the form in which a hollow piston moves to and fro, under the influence of a lever connected to the "shocked" member to be relatively controlled, in a closed cylinder with a compression chamber to contain liquid at each end of the cylinder.

The conditions required for efficient working of apparatus of the kind described above are that the compression chambers should be kept full of liquid, that all air or gas which may be accumulated therein shall be expelled, that the required resistances (which may or may not be equal), dependent on the the application of the apparatus, shall be respectively offered to the movement communicated to the piston by the "shocked" member in each of the two directions of movement, and that such resistance shall be practically constant for all temperatures.

The object of this invention is to secure these conditions in a better manner than is done in any known apparatus. A further object of this invention is to reduce or eliminate side thrust on the piston as it is moved to and fro.

According to this invention I make apparatus as follows:—On movement of the piston in either direction liquid in the chamber compressed passes through a conduit or conduits, which may be without the cylinder or through the piston itself, to the other chamber, separate and distinct conduits being provided for the passage of liquid in each direction. The conduits connecting the two pressure chambers are provided with spring loaded one-way valves offering predetermined resistance, and if desired the springs are of different power so that greater resistance will be offered to movement of the piston in one direction than in the other. The areas of the valve ports are of sufficient dimensions to render the variation of viscosity of the fluid used owing to change of temperature practically negligible. A reservoir is provided preferably at the side of the cylinder, with a conduit or conduits leading from the bottom thereof to the bottom of one or both, but preferably both, of the pressure chambers, such conduit or conduits being provided with a one-way valve opening to admit liquid to the pressure chambers respectively for the purpose of replenishing such chambers should a vacuum occur therein through escape of oil or other liquid, and also a conduit from the top of a pressure chamber or other highest point of the compression system into the top of the reservoir, with means for adjusting the area thereof to a fine adjustment for the purposes of an air leak.

I also arrange for the purpose of eliminating or reducing side thrust on the piston that the application of force to the piston shall be (subject to a small margin of deviation) in the line of its axis.

In the accompanying drawings a more detailed description by way of example of a shock absorber made according to my invention is illustrated.

Fig. 1 is a sectional elevation on line 1—1 of Fig. 2, Fig. 2 is a plan view of Fig. 1, Fig. 3 is an end sectional elevation on line 3—3 of Fig. 1 and Fig. 4 is a sectional view of an alternative form of construction for part of Fig. 1.

$a$ is a casting comprising a cylinder $a^1$, an overhead outstanding part $a^2$, a cylindrical portion $a^3$ formed in such upstanding part at right angles to the axis of the said cylinder $a^1$, a chamber or reservoir $a^4$ enveloping the middle of the cylinder $a^1$ extending from the upstanding part $a^2$ down one side of and across the bottom of the cylinder, where it assumes internally a cylindrical shape. There is a gap $a^5$ in the wall of the cylinder opening into the upstanding part $a^2$ and extending round the cylinder co-extensive with the reservoir. $a^6$ is a boss formed on the casting in which is a cylindrical chamber $a^7$ with a recess $a^8$ in the lower end, communicating with the interior of the cylinder $a^1$ via the drilled holes $a^9$ and $a^{10}$. $a^{11}$ is a cap closing the open end of the cylinder $a^1$ when the working parts are assembled, secured by studs $a^{12}$ and nuts $a^{13}$. $a^{14}$ is a conduit drilled through the casting and into the cover $a^{11}$ connecting the reservoir $a^4$ with the respective ends of the cylinder constituting the compression chambers via drilled holes $a^{15}$, and $a^{16}$, and $a^{17}$ (shown in dotted lines in Fig. 2) is a conduit drilled through the casting connecting one end of the cylinder $a^1$ with the cylindrical chamber $a^7$, via hole $a^{18}$ (shown in dotted lines in Fig. 2) drilled through the boss $a^{19}$, and $a^{20}$ is a drilled conduit for the purpose hereinafter appearing. $b$ is a hollow piston having at the top a gap or hole $b^1$ and a gap or hole at the bottom $b^2$ and having formed at one end thereof a chamber $b^3$. $b^4$ is a valve with a stem $b^5$ fitting a guide hole in a boss $b^6$ formed on the piston, $b^7$ is a groove in the stem to prevent the same from being air bound, $b^8$ is a spiral spring closing the valve and seating on the plate $b^9$ which is secured by three screws $b^{10}$, $b^{11}$ are conduits drilled through bosses formed in the piston from one end of the piston to the interior of chamber $b^3$, $c$ is a rocking shaft actuated by the lever $c^1$ integral therewith, which at its free end is operably connected to the "shocked" member to be controlled for example the axle of a motor car. The shaft $c$ has an extended part $c^2$ and a square part $c^3$, and the shaft rotates in bushes $c^4$ and $c^5$, $c^6$ is a packing, $c^7$ a chamfered ring, $c^8$ a spiral spring pressing on such ring and $c^9$ is a cap secured to the casting by studs $c^{10}$ and nuts $c^{11}$. $d$ is a lever with a split boss secured to the square portion of the shaft $c$ by means of pinch bolt $d^1$ and nut $d^2$, $d^3$ is an eye piece secured to one end of the piston by a threaded extension passing through a hole in such end and a nut $d^4$, $d^5$ is a tab washer, $d^6$ are links connecting the lever $d$ with eye piece $d^3$ and secured to such members respectively by shouldered pins $d^7$ riveted over at the ends. $e$ is a valve seating on recess $a^8$ under the influence of the spring $e^1$, $e^2$ is a plug, recessed in one end to locate the spring $e^1$ and tapped to receive the screw $e^3$ with a drilled hole $e^4$, and a small drilled passage way controlled by a ball valve $e^5$ constituting an air leak, but offering great resistance to the passage of oil, the plug $e^2$ and the boss $a^6$ are shaped to form an annular space $e^6$ into which both the hole $e^4$ and $a^{20}$ open, thus forming a way for air escaping through the ball valve $e^5$ to the reservoir.

In Fig. 4 is shown another example of the boss $a^6$ and connected parts except that there is no ball valve $e^5$, and the screw $e^3$ is formed with an extension $e^7$ extending down the air leak passage way but allowing the required clearance for the passage of air. The valve $e$ is provided with a guide stem $e^8$ extending down the hole $a^9$ in the casting connecting the two holes $a^{10}$, $e^9$ is a groove in such guide to facilitate the movement of the valve $e$. $f$ are ball valves, $f^1$ are threaded plugs engaging tapped holes in the casting with extensions $f^2$ to prevent the possible displacement of the balls. $g$ is a hollow plug externally threaded and provided with a flange $g^1$, engaging a thread in the cylindrical part of the reservoir $a^4$, and having three annular recesses $g^2$ in the base of each of which are rows of holes $g^3$, $g^4$ is a plate closing the open end of the plug $g$, and $g^5$ is a gauze filter. The purpose of this plug and filter is to prevent the entrance of grit and other impurities into the valve passages from the reservoir. The oil passes from the reservoir through the gauze $g^5$ into two of the spaces $g^2$, through two rows of holes $g^3$ to the interior of the plug $g$, thence through one of the rows of holes $g^3$ to the remaining annular space $g^2$ and thence along the conduits $a^{14}$ to the compression chamber. The oil is, by this means, filtered before entering the conduits $a^{14}$ and reaching the valves.

The apparatus is bolted to the chassis frame by bolts $h^1$ passing through feet $h^2$, and nuts $h^3$. $i$ is a stoppered orifice through which the apparatus can be supplied with oil or other liquid.

The spring $e^1$ is more powerful than the spring $b^8$ and greater resistance will be offered to a movement of the piston to the right than to the left the right end of the cylinder being accordingly referred to as the high compression chamber and the left hand end as the low compression chamber.

The chamber at each end of the piston being filled and the reservoir supplied with oil, the operation of the apparatus is as follows.

In the event of a movement of the lever $c^1$ in one direction the piston will be moved to the right compressing the oil in the high compression chamber, oil will be forced via the holes $a^{10}$ through the valve $e$ always encountering the resistance of the spring $e^1$, via the hole $a^{18}$ and conduit $a^{17}$ into the low pressure chamber. If the lever $c^1$ is moved in the opposite direction the piston will be forced to the left and oil in the low compression chamber will be forced via the conduits $b^{11}$ into the chamber $b^3$ through the valve $b^4$ encountering the resistance of the spring $b^8$ into the high compression chamber.

The effect of the large areas of the spring loaded valves as compared with fixed small passage ways hitherto adopted in hydraulic shock absorbers is to overcome the inconsistency in functioning caused by variations of viscosity of the liquid due to changes of temperature, the opening of the valve varying with the viscosity of the oil or liquid used.

The effect of the arrangement of the lever $d$, link $d^6$ and eye piece $d^3$ is to ensure movement of the piston without undue load against the walls of the cylinders.

The effect of the arrangement of the reservoir and of the rocking shaft is to secure that all leaking of oil past the piston shall fall into the reservoir either from the sides of the piston or through the gap $b^2$.

If through leakage past the piston or otherwise either compression chamber is not filled with oil the vacuum thereby occasioned will immediately suck oil from the reservoir via the conduits $a^{14}$, $a^{15}$ valves $e$ and conduit $a^{16}$.

In the event of any air in either of the compression chambers it will travel to the highest part of the compression system and will be driven out through the small air leak and ball valve $e^5$ or the small clearance past the stem $e^7$ (shown in Fig. 4) as the case may be.

What I claim is:—

1. A shock absorber comprising a hollow double-ended piston in a closed cylinder with a liquid compression chamber at each end of the cylinder, two conduits connecting the compression chambers each controlled by a one-way valve admitting liquid to the chambers respectively, a reservoir to contain a quantity of the compression liquid formed on the side of and extending to the bottom of, the cylinder, a gap or opening in the wall between the cylinder and the reservoir, two conduits from the bottom of such reservoir to the compression chambers respectively, each provided with a one-way valve admitting liquid to the compression chamber with which it is connected, and mechanism including a shaft, situate without, and in a plane passing through the centre of, and normal to the axis of the cylinder, rocking in bearings attached to the cylinder, a suitably shaped hole in the wall of the cylinder nearest to the shaft and evenly disposed on each side of the said plane, a like suitably shaped hole in the wall of the piston, a lever secured to the said shaft projecting through the said holes to the centre of the piston, a link hinged to the free end of such lever and to one end of the piston, another lever projected from the said shaft without the cylinder, and operatively connected to the "shocked" member, whereby movement of the "shocked" member causes the piston to move in one direction or the other.

2. A shock absorber comprising a hollow double ended piston in a closed cylinder with a liquid compression chamber at each end of the cylinder, two conduits connecting the compression chambers each controlled by a one-way valve admitting liquid to the chambers respectively, a small passage way from the uppermost part of the compression system to the outside of same permeable by air, but offering great resistance to oil or other liquid, and mechanism including a shaft, situate without, and in a plane passing through the centre of, and normal to the axis of the cylinder, rocking in bearings attached to the cylinder, a suitably shaped hole in the wall of the cylinder nearest to the shaft and evenly disposed on each side of the said plane, a like suitably shaped hole in the wall of the piston, a lever secured to the said shaft projecting through the said holes to the centre of the piston, a link hinged to the free end of such lever and to one end of the piston, another lever projected from the said shaft without the cylinder, and operatively connected to the "shocked" member, whereby movement of the "shocked" member causes the piston to move in one direction or the other.

3. A shock absorber as claimed in claim 2, the small passage way being provided with a one-way valve admitting air to escape from the compression system.

4. A shock absorber comprising a hollow, double ended, piston, a closed cylinder containing said piston and having a liquid compression chamber at each end, conduits connecting said compression chambers, one way controlling valves admitting liquid to the respective chambers, a reservoir for compression liquid, conduits leading from said reservoir to the respective compression chambers, each of said conduits being provided with a one-way valve for the admission of liquid to the compression chamber with which it is connected, a small conduit or opening from the uppermost part of the compression system to the outside of the same, permeable to air but offering resistance to the passage of the compression liquid and means operatively connecting the shocked members to the piston.

5. A shock absorber as claimed in claim 4, one of the conduits connecting the two compression chambers being through the body of the piston.

6. A shock absorber as claimed in claim 4, the reservoir to contain a quantity of compression liquid being located on the side of the cylinder, a conduit from the bottom of such reservoir to one of the compression chambers with a one-way valve admitting liquid to such chamber, and means including a shaft operably connected to the piston, rocking in bearings free from the "compression" oil for operably connecting the shocked member to the piston.

7. A shock absorber as claimed in claim 4, the small conduit or opening being provided with a one-way valve admitting air to escape from the compression system.

8. A shock absorber as claimed in claim 4, with a filter between the reservoir and the conduit, or conduits, leading therefrom to the compression chambers.

In witness whereof I have signed this specification.

FREDERICK HENRY ROYCE.